June 15, 1948.                J. FRASER                    2,443,499
                              MIXING VALVE
Filed Jan. 18, 1947                                  4 Sheets-Sheet 4
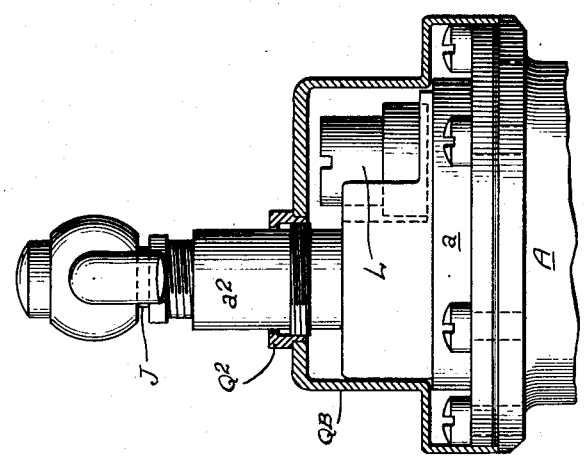
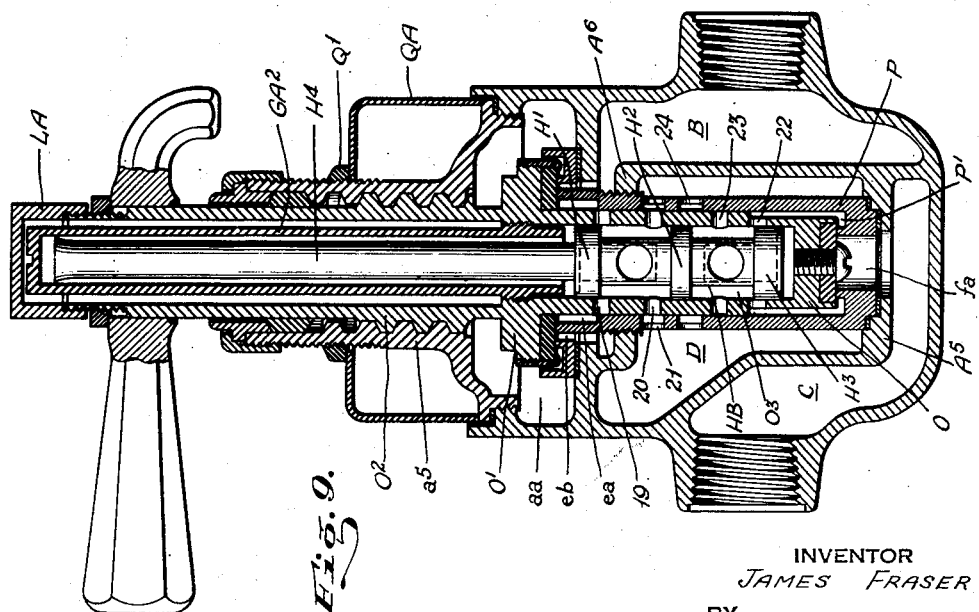
INVENTOR
JAMES FRASER
BY
John E. Hubbell
ATTORNEY Patented June 15, 1948

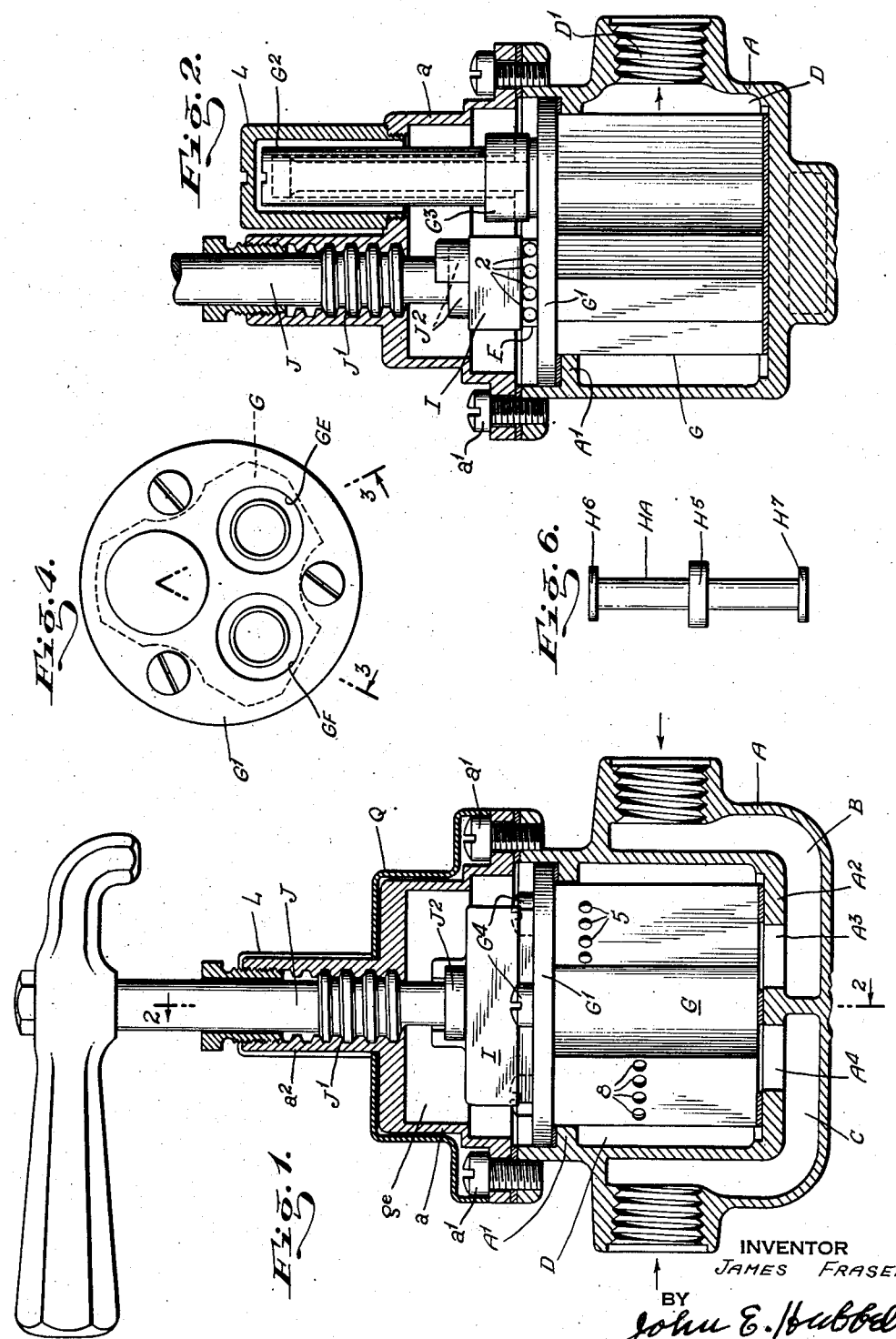

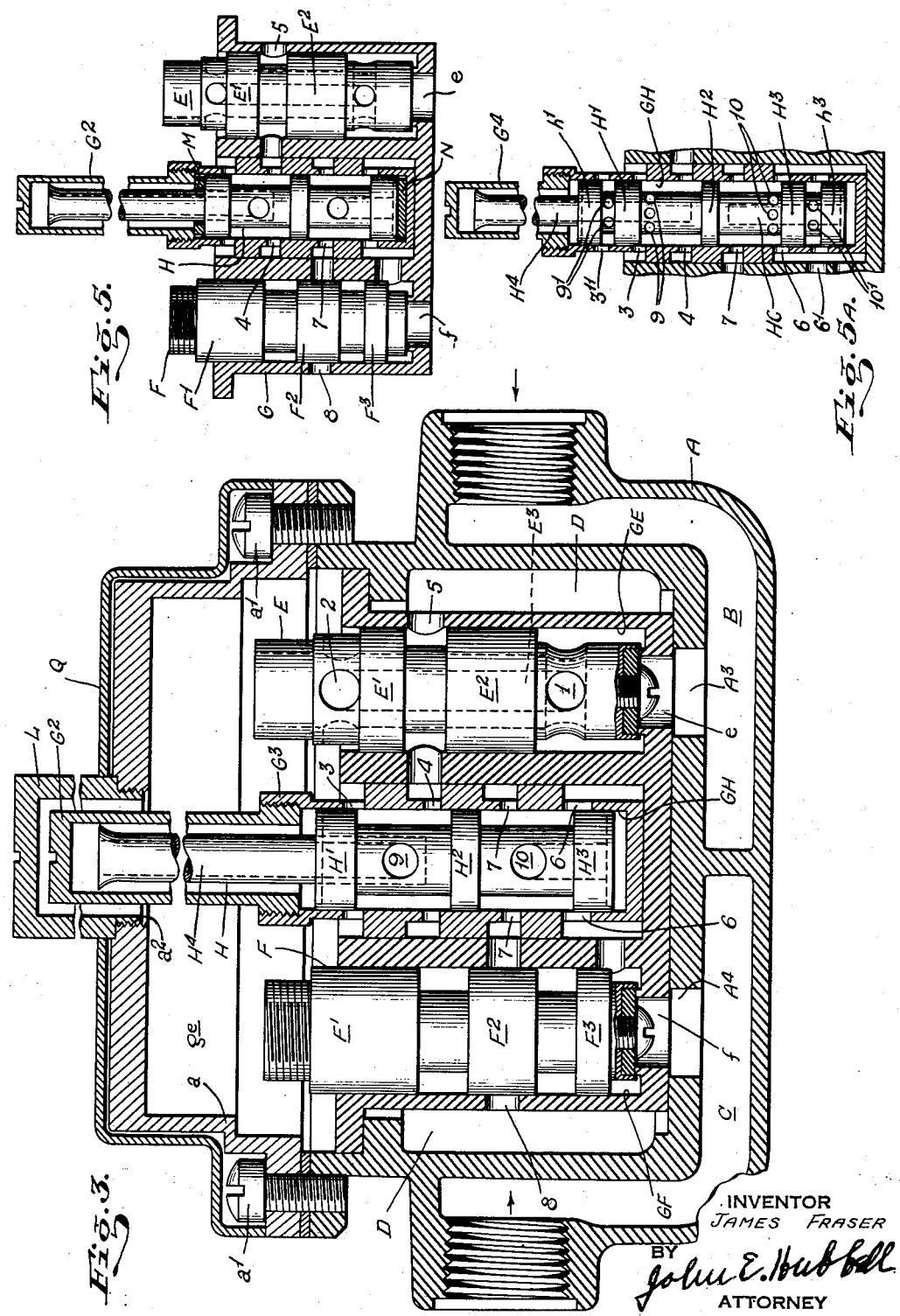

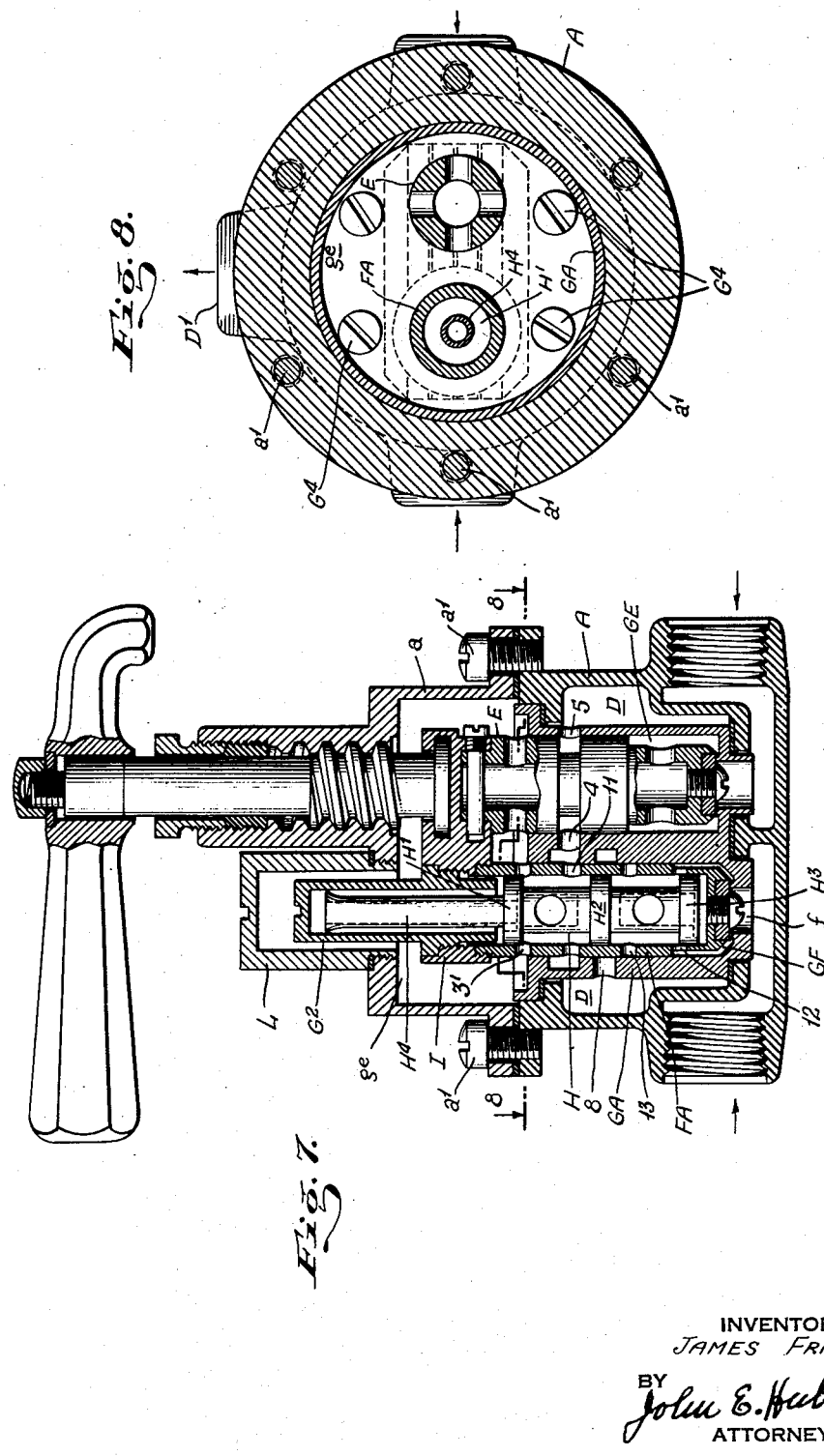

2,443,499

UNITED STATES PATENT OFFICE 2,443,499

MIXING VALVE

James Fraser, Wilmington, Del., assignor to Speakman Company, Wilmington, Del., a corporation of Delaware Application January 18, 1947, Serial No. 722,863

8 Claims. (Cl. 277—18)

The general object of the present invention is to provide an improved mixing valve of the known type which is adapted for use in mixing two fluids in proportions dependent on the adjustment of the mixing valve, and which includes pressure equalizing means comprising an element, ordinarily in the form of a plunger or piston valve, which operates in response to variations in the relative supply pressures of the two fluids to compensate for the tendency of such relative variations to vary the relative amounts of the two fluids included in the mixture formed by the valve when given a particular adjustment.

A mixing valve of the above mentioned type finds its principal field of use in supplying showerheads with hot and cold water mixtures at temperatures normally dependent on valve adjustments made by the user. The inclusion in such a valve of pressure equalizing mechanism responsive to variations in the hot and cold water supply pressures, greatly reduces the risk that the user will be scalded as a result of a sudden reduction in the pressure at which the cold water is supplied to the mixing valve. As is well known to those skilled in the art, in most shower-bath installations, a substantial drop in the cold water supply pressure may result almost instantaneously from the opening of some more or less distant discharge valve in the same cold water supply system.

A specific object of the present invention is to provide a simple, compact and effective mixing valve, including a pressure equalizing mechanism which is so disposed and arranged that in the use of the valve, the portion of the valve structure with which the hand of the user does, or may, come into contact in adjusting the valve, will be subjected to the cooling action of the cold water, and not to the heating action of the hot water supplied to the valve.

When a mixing valve including a pressure responsive element of the above mentioned character, is used with water containing impurities forming a deposit on the wall of the chamber in which the pressure responsive element works, said element is apt to stick in, and be cemented to the wall of, said chamber, and be thereby made inoperative to compensate for variations in the relative supply pressures of the fluids to be mixed. The effect produced when the pressure responsive element sticks and becomes inoperative, depends upon the position in which the valve sticks. Ordinarily, that position is not readily determinable, and it may be such that the water discharged by the mixing valve will consist entirely of hot water, or will consist entirely of cold water, or will be a mixture having a temperature very different from the desired temperature which the adjustment of the mixing valve would produce if the pressure equalizing mechanism were in its normal operating condition.

A primary object of the present invention is to so construct and arrange a mixing valve including pressure equalizing means of the character mentioned above, as to permit ready access to the pressure responsive element for inspection, cleaning and replacement, when necessary, without giving rise to leakage and without requiring any general dismantling or change in the mixing valve structure, and without rendering the valve inoperative except for the short period required for the removal and replacement of the pressure responsive element and such inspection or cleaning operation as may be necessary. A more specific object of the invention is to provide a simple and effective construction and arrangement for making said element readily accessible and replaceable, which may be incorporated in mixing valves of various types heretofore developed, without requiring any modification in the general operative principles and type of construction of such valves.

A further specific object of the invention is to provide means through which the operative effect of the pressure equalizing means may be readily eliminated, temporarily or permanently, without interfering with the effective use of the mixing valve in the manner in which such valve customarily operates when not provided with a pressure responsive element. The need for thus eliminating the compensating action of the pressure responsive element may occasionally develop as a result of impurities in the available water which make the continued use of the compensating means practically undesirable.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Of the drawings:

Fig. 1 is a sectional elevation of a mixing valve embodying one form of my invention;

Fig. 2 is a partial section on the line 2—2 of Fig. 1;

Fig. 3 is a developed section through the valve structure shown in Figs. 1 and 2, taken on the broken line 3—3 of Fig. 4;

Fig. 4 is a plan view of a portion of the valve structure shown in Figs. 1 and 2;

Fig. 5 is a partial sectional elevation taken similarly to Fig. 3 and illustrating means for temporarily rendering the pressure responsive element shown in Figs. 1 to 4 inoperative to effect its compensating action, without preventing the valve from operating as a mixing valve;

Fig. 5A is a sectional elevation illustrating a modification of a portion of the apparatus shown in Figs. 3 and 5;

Fig. 6 is an elevation of a non-compensating part adapted to replace the pressure compensating element of the valve shown in Figs. 1–4;

Fig. 7 is a sectional elevation of an embodiment of the invention in a mixing valve structure of modified form;

Fig. 8 is a section on the line 8—8 of Fig. 7;

Fig. 9 is a sectional elevation of an embodiment of the invention in a third form of mixing valve structure; and Fig. 10 is an elevation partly in section of a valve differing from that shown in Figs. 1–4 in the form of the valve casing.

In Figs. 1–4, A designates the body portion and $a$ the bonnet portion of a valve housing formed with a cold water inlet chamber B, a hot water inlet chamber C, an outlet chamber D receiving hot and cold fluids in regulated proportions from the chambers B and C, and having an outlet D' through which the mixture formed is discharged. As shown, communication between each of the chambers B and C and the chamber D is directly controlled by a corresponding valve member E or F. The said valve members E and F are mounted in valve chambers GE and GF, respectively, formed in a chambered block, or housing part G, constituting a separable part of the rigid valve housing structure. The valves E and F are each circular in cross-section, and of the piston valve type. The valve chamber GE in which valve E works is circular in cross-section and communicates at one end with the cold water inlet chamber B through a port $e$ coaxial with and formed in an end wall of the chamber GE, and smaller in cross-section than the latter. The chamber GF in which the valve F works, is parallel to the chamber GE and communicates at one end with the hot water inlet chamber C through a port $f$ coaxial with and formed in an end wall of the chamber GF, but smaller in diameter than the latter. The block G is formed with a third cylindrical valve chamber GH alongside the chambers GE and GF and containing a floating pressure equalizing plunger or piston valve H. The block G is secured in place in the housing shell by screws $G^4$ clamping a marginal flange portion G' of the block against a parallel flange portion A' of said shell. When so clamped in place the opposite end of the block bears against a partition wall portion $A^2$ of the shell which forms portions of the walls of the supply chambers B and C, and which is formed with openings $A^3$ and $A^4$ in register with the ports $e$ and $f$.

In the subsequent description of the various valve mechanisms shown, the relative positions of different portions of each valve mechanism will ordinarily be referred to as though the various valve members and chambers of the mechanism are vertical, as they appear to be in the drawings. It is to be understood, however, that the operative characteristics of the valve mechanisms are not dependent upon the direction in which the valves and valve chambers extend. For example, the mechanism shown in Figs. 1–4 will operate equally well with the valve structure turned end for end so that the ports $e$ and $f$ are at the tops of the chambers GE and GF instead of at their lower ends, or with said chambers disposed horizontally, or at an inclination to the horizontal.

The valve members GE and GF have their upper ends attached to a crosshead I, shown in Figs. 1 and 2 but omitted in Fig. 3 to simplify the figure. The crosshead I is located in a space $ge$ above the block G and below and surrounded by the bonnet portion $a$ which is detachably secured by screws $a'$ to the valve housing structure. The crosshead I may be vertically adjusted relative to the valve body A, by the rotation of a valve spindle J which extends through and has a threaded connection J' with the hub portion $a^2$ of the valve bonnet $a$. A swivel connection $J^2$ between the valve spindle J and crosshead I is provided, so that the spindle may rotate about its own axis relative to the crosshead, and thereby move the spindle and crosshead in the direction of the length of the spindle. When the valve spindle J is rotated in the valve closing direction, the valve members E and F are moved downward into the position in which they engage the valve seat portions of the end walls of the valve chambers GE and GF, respectively, surrounding the ports $e$ and $f$, and thereby close communication through said ports between the chambers B and C and the chambers GE and GF, respectively. When the valve spindle is rotated in the opposite direction, the valve members E and F are moved axially away from and open the ports $e$ and $f$. When the port $e$ is thus opened, cold water passes from the inlet chamber B into the adjacent end of the valve chamber GE and hot water passes through the then open port $f$ into the adjacent end of the valve chamber GF.

The valve member E comprises longitudinally spaced cylindrical portions E' and $E^2$, each having a sliding fit in the chamber GE, and comprises end portions and a portion connecting said cylindrical portions, which are smaller in diameter than the portions E' and $E^2$. A valve seat engaging washer may be secured to the lower end of the valve member E. The member E is formed with an axial passage $E^3$ which is closed at its lower end, but which is in communication at all times with the portion of the valve chamber GE below the valve portion $E^2$ through one or more radial ports 2 formed in the valve member E. The axial passage $E^3$ is adapted to discharge cold water through one or more radial ports 2 formed in the reduced upper end portion of the valve member E into the space $ge$ within the bonnet $a$ and above block G and in which the crosshead I is received. In consequence, when the valve member E is out of its closed position, the bonnet space $ge$ is in open communication with the cold water inlet chamber B. The bonnet space $ge$ is in communication with the upper portion of the pressure equalizing chamber GH through one or more ports 3. Each port 3 may be variably throttled, as hereinafter explained, by the pressure responsive element H. The portion of the chamber GH receiving water from the chamber $ge$ through the port or ports 3 discharges water into the mixing chamber D, when the adjustments of the element H and valve member E permits, through a discharge passage including one or more ports 4 in the wall separating the chamber GH from the valve member GE, the annular space surrounding the reduced diameter portion of the valve member E connecting the portions E' and $E^2$, and a port 5 in the partition wall between the valve chamber GE and the mixing chamber D.

As shown, the hot water valve member F comprises spaced apart upper, intermediate and lower cylindrical portions F', $F^2$ and $F^3$, respectively, and comprises a portion of reduced diameter connecting the cylindrical portions F' and F², a portion of reduced diameter connecting the portions F² and F³, and a lower end portion of reduced diameter to which a seat engaging washer may be attached. When the valve member F is moved upward away from its seat and opens the port f, hot water passes through the port f and into the lower end of the valve chamber GF and passes from the latter into the lower portion of the pressure equalizing chamber G through ports 6 in the partition wall between the chambers GF and GH. Water thus entering the lower portion of the chamber GF, passes therefrom to the mixing chamber D when the position of the valve members E and F permit, through ports 7 in the partition wall between the chambers GF and GH, and through the annular space in the chamber GF between the ends of the cylindrical portions F² and F³ of the valve member F, and through the port or ports 8 in the partition wall between the valve chamber GF and the mixing chamber D. The annular space in the valve chamber GF surrounding the reduced portion of the valve member F which connects the cylindrical portions F'' and F², has no operative purpose, but is provided merely to reduce the mass and facilitate the construction of valve member F. As is hereinafter explained, the inlet ports 3 and 6 to the chamber GH are subject to inverse throttling effects by the element H in accordance with changes in the relative pressures in the supply chambers B and C, and the outlet ports 5 and 8 are subjected to inverse throttling effects by the valve members E and F as the latter are simultaneously adjusted by the rotation of the valve spindle J.

The member H comprises three spaced apart cylindrical portions H', H² and H³, with upper and lower portions of reduced diameter respectively connecting the cylindrical portion H² to the portion H' and to the portion H³, and with a tubular portion H⁴ of reduced diameter extending upwardly from the cylindrical portion H'. The upper end of the valve chamber GH is closed by a cap member G² which comprises a tubular body spaced away from the portion H⁴, and closed at its upper end. The lower end of the cap member G² is externally threaded and is received in the internally threaded upper end portion of a tubular wall member G³. The latter surrounds the chamber GF and extends above the block G. To facilitate the manufacture of the valve structure illustrated, the wall part G³ may well be, and as shown is in the form of a tube closed at its lower end and open at its upper end. The part G³ may be proportioned to have a driving fit in a receiving socket or chamber formed in the member G and into which the part G³ is forced. Its cylindrical inner and outer surfaces are machined after having drilled in it wall ports or openings constituting portions of the previously mentioned ports 3, 4, 6 and 7.

The member H is also formed with an upper axial port or passage which merges into the bore or axial passage in the tubular portion H⁴ of the member H above the cylindrical portion H'. The above-mentioned axial passage open at its lower end through one or more radial ports 9 into the annular space in the chamber GH between the cylindrical portions H' and H² of the member H. The member H is also formed with a lower axial passage open at its lower end to the portion of the member GH below the cylindrical part H³ of the member H and open at its upper end through one or more radial ports 10 into the portion of the space in the chamber GH between the portions H² and H³ of the member H. The purpose of the two axial passages formed in the member H as just described, and their associated radial ports 9 and 10, is to enable the member H to serve as a movable partition moving in response to a difference between the pressure of the cold water in the portion of the chamber GH above the plunger portion H² and the pressure of the hot water in the portion of the chamber GH below the plunger portion H².

When the cold water supply pressure is reduced without a corresponding reduction in the hot water supply pressure, the member H moves upward with the result that the effective flow area through the hot water supply port 6 is reduced by the throttling valve action of the cylindrical portion H³ of the plunger H. At the same time, the effective flow area of the cold water port 3 is increased by the upward movement of the piston portion H' of the plunger H. On an increase in the cold water supply pressure relative to the hot water supply pressure, the portion H' moves down to increasingly throttle the port 3 and the portion H³ moves down to increase the free flow area through the port 6. In normal operation, the pressure responsive plunger H thus floats in the position in which the flow volumes through the respective hot and cold water inlets 6 and 3 to the chamber GH are so regulated that the cold water pressure in the upper portion of the chamber GH, which tends to depress the plunger H, is balanced or neutralized by the upwardly acting pressure of the hot water in the lower portion of the chamber GH. The hot and cold water pressures in the lower and upper end portions of the chamber GH are thus normally maintained equal, although the pressures in the hot and cold water supply chamber C and B, may be widely different at times.

With the hot and cold water pressures in the upper and lower portions of the chamber GH balanced by the plunger H, as just described, the relative amounts of hot and cold water passing into the mixing chamber D may be accurately regulated by the axial adjustments of the crosshead I and the valve members E and F attached to the crosshead. When the valve members E and F are given their initial opening movements respectively away from the ports e and f, a path of flow for cold water between the cold water supply chamber B and the outlet chamber D, is established. That flow path is reduced as the valve members are moved into their wide open position, by the throttling action of the cylindrical portion E² of the valve member E on flow through the ports 4 and 5 through which cold water passes from the upper portion of the chamber GH to the mixing chamber D. The initial opening movements of the valve members E and F opens a path for the flow of hot water from the inlet chamber C to the lower portion of the pressure equalizing chamber GH, but the passage of hot water from the lower portion of the GH to the mixing chamber D, is prevented by the cylindrical portion F² of the valve member F, until the latter is moved upward from its closed position far enough to raise the lower edge of the cylindrical portion F² above the lower edges of the ports 7 and 8. Further upward movement of the hot water valve member F progressively increases the effective flow area through the ports 7 and 8 to a maximum which ordinarily is obtained only when the upward movement of the cold water valve member E causes its portion E² to close the ports 4 and 5. When the valves E and F attain their last mentioned position, only hot water is supplied to the chamber D.

As will be apparent from the foregoing, so long as the pressure equalizing plunger H is operative to maintain the cold water pressure in the upper portion of the chamber GH equal to the hot water pressure in the lower portion of that chamber, the relative amounts of hot and cold water passing into the outlet chamber D can be regulated with accuracy by the simultaneous axial adjustments of the valve members E and F in their respective valve chambers GE and GF. The operative effect of the pressure equalizing mechanism in making the amount of hot and cold water supplied to the mixing valve accurately dependent on the adjustment positions of the valve members E and F, is practically desirable. Ordinarily, however, the most important operative effect of the pressure equalizing mechanism is the protection which it gives against the scalding of the users of the water discharged by the valve on a sudden drop in the cold water supply pressure. As those skilled in the art will understand, the equalizing mechanism cannot give protection against scalding on a failure in the cold water supply pressure when the plunger H is not free to move in the chamber GH when the plunger happens to stick in any position in which it totally prevents hot water from passing to the outlet chamber D.

In the practical use of a mixing valve having an automatic pressure equalizing mechanism operating in the general manner described above, it has been found that the plunger is apt to stick and be cemented in some fixed position in the chamber GH when the water passing through the mixing valve contains any impurity or impurities which form deposits in solid form on walls of chambers and passages through which the water passes. The construction shown in Figs. 1 to 4 permits the plunger H to be quickly and easily removed from the chamber GH to permit the removal of deposits on the plunger and on the walls of said chamber without giving rise to leakage. To this end, the portion $H^4$ of the plunger H is made of such length and is so disposed that its upper end projects through an opening $a^2$ in the bonnet member $a$ and may be grasped by the hand of an operator on the removal of two threaded elements of the valve structure. One of those elements is the previously mentioned cap part $G^4$ which directly surrounds the part $H^4$ in the normal condition of the apparatus. The second of said elements is a cap member L having a tubular body and a closed upper end, and open and externally threaded at its lower end, which is normally screwed into an internally threaded opening $a'$ in the valve bonnet $a$, and through which the part $H^4$ and cap $G^2$ extend. With the caps L and $G^2$ removed from their threaded seats the plunger H may be withdrawn and any solid deposit thereon or on the inner wall of the chamber GH may then be quickly removed, after which the plunger H may be put back in the chamber GH and the cap elements $G^2$ and L screwed into their threaded seats, thus restoring the mechanism to its normal operative condition.

In some cases it may be desirable to include a mixing valve of the character shown in Figs. 1 to 4 in an installation in which the automatic pressure equalizing action of the plunger H is undesirable, at least at the time when the installation is made, because of the character of the water passing through the valve, or for some other reason. In some cases also, after a mixing valve of the character shown in Figs. 1 to 4 has been installed, a change in the character of the water passing through the valve, or some other condition change may make the use of the automatic pressure equalizing mechanism permanently or temporarily undesirable. When for any reason the use of means for effecting the automatic pressure equalizing action appears undesirable, that action can be eliminated temporarily or permanently by equalizing the throttling action of the portions $H^3$ and $H'$ of the plunger H on the flows through the ports 3 and 6, without eliminating the barrier action of the portion $H^2$ of the member H against flow between the upper and lower portions of the chamber GH.

One simple expedient for use in eliminating the pressure equalization action of the apparatus shown in Figs. 1–4, is illustrated in Fig. 5. In that figure, the member H is locked in its intermediate position by inserting blocking devices, or thrust parts M and N, between upper and lower portions of the member H and respectively adjacent wall portions of the chamber GH. As shown in Fig. 5, the part M is a washer surrounding the part $H^4$ and forming a thrust block interposed between the upper end of the plunger portion H' and the lower end of the cap $G^2$. The part N of Fig. 5 is a disc interposed between the bottom wall of the chamber GH and the lower end of the plunger H. With the parts M and N in place, the plunger H is fixed in a position in which, if the parts M and N have the proper thicknesses, the ports 3 and 6 are subjected to similar mild throttling actions by the portions H' and $H^3$ of the plunger H. In consequence, the valve mechanism is then operative when the pressure in the cold and hot water supply chambers B and C are suitably related, to vary the temperature of the mixture formed in accordance with the displacement of the valve members E and F from their respective positions. Stated differently, with the member H blocked in its intermediate position as shown in Fig. 5, the valve mechanism illustrated in Figs. 1–5 is adapted to operate as a mixing valve of the widely used type shown in the Speakman Patent 1,121,879 of December 22, 1914.

Another mode of preventing the valve mechanism illustrated in Figs. 1–4 from producing a pressure equalizing action, comprises the replacement of the member H by a longer member HA of the general form shown in Fig. 6. As there shown, the member HA comprises a central cylindrical portion $H^5$ which serves the flow barrier purpose of the portion $H^2$ of the plunger H, and comprises upper and lower portions $H^6$ and $H^7$ spaced far enough apart to prevent axial movement of the member HA between the lower closed end of the chamber GH and the lower end of the cap part $G^4$. The end portions $H^6$ and $H^7$ are of such small axial extent that when in place in the chamber GH they can have no throttling effect on flow through the ports 3 and 6.

With the part HA included in the valve mechanism shown in Figs. 1 to 4, that mechanism will operate just as it does with the plunger H in place, so long as the water pressures in the cold and hot water supply chambers B and C are uniform and equal. When those water pressures fluctuate, the valve mechanism is still capable of operating as well as the mixing valve disclosed in said Speakman Patent No. 1,121,879 or any other mixing valve which includes no pressure equalizing mechanism.

It is thus possible to install the valve mechanism shown in Figs. 1–4 for use either with or without the pressure equalizing action as conditions may make desirable. This has the advantage, for example, of enabling a dealer to supply mixing valves for use with or without the pressure equalizing action, without requiring him to carry more than a single type of mixing valves in stock. It has the special advantage, also, of making it possible to quickly and easily eliminate the pressure equalizing action of a mixing valve already installed without risk of leakage and without marring the wall in which the valve may be installed, when because of a change in the character of the water passing through the valve, or for some other reason, the pressure equalizing action is found undesirable. In either case, the valve, after being rendered inoperative to effect the pressure equalizing action, may be quickly and easily put back into condition to effect such action.

The present invention may be used with advantage in mixing valves differing in type and form from the valves shown in Figs. 1–4. Thus the mixing valve shown in Figs. 7 and 8 differs essentially from the structure shown in Figs. 1–4 in that it comprises a block GA, replacing the block G of Figs. 1–4, which includes valve chambers corresponding to the chambers GE and GF of Figs. 1 to 4, but has no chamber corresponding to the pressure equalizing chamber GH. In Figs. 7 and 8, the pressure equalizing plunger H is located in the bore or hollow interior of a tubular valve FA working in the chamber GF and performing the functions of the valve F of Figs. 1–4. In Fig. 7 the cap $G^2$ which surrounds the upper portion $H^4$ of the member H has its lower end threaded into the upper end of a passage through the crosshead I, into the lower end of which the upper end of the tubular valve member FA is threaded.

The valve member FA is formed adjacent its upper end with wall ports $11$ through which cold water passes from the bonnet chamber space $ge$ into the portion of the space within the tubular valve member FA between the cylindrical portions $H'$ and $H^2$ of the member H, the ports $11$ being throttled by the portion $H'$ under the same conditions in which said portion throttles the ports $3$ shown in Fig. 3.

When the axial position of the valve member E permits, cold water passes from the upper portion of the space within the valve member FA to the outlet chamber D through ports $11$ in the valve FA and thence through registering ports $4$ and the ports $5$ in the wall of the valve chamber GE, as in the construction first described. When the valve member FA is moved out of its closed position, hot water entering the valve chamber GF through the port $f$ passes from the latter through ports $14$ in the tubular wall of the valve member FA into the space within the latter and between the cylindrical portions $H^2$ and $H^3$, provided the ports $14$ are not closed by the piston portion $H^3$, as they are in the event of a total failure in the cold water supply pressure. When the position of the portion $H^3$ of member H permits hot water to enter the valve chamber through the ports $14$, water passes from that chamber into the outlet chamber D through ports $8$ in the wall of the chamber GF and ports $13$, formed in the tubular wall of the valve member FA and brought into register with the ports $8$ when a sufficient opening movement is given to the valve member FA.

As will be apparent, the overall operation of the valve mechanism shown in Figs. 7 and 8, does not differ significantly from that of the valve mechanism shown in Figs. 1–4. The plunger H shown in Figs. 7 and 8 can be removed, locked in a stationary position by blocking parts M and N, or replaced by the device HA of Fig. 6, exactly as in the arrangement shown in Figs. 1–4.

In Fig. 9 I have illustrated the use of the present invention in a mixing valve of the type in which the lower end of a single, axially adjustable, hollow valve member O serves to open and close an inlet port $fa$ in the lower end of a tubular valve chamber element P, while an annular flange-like valve part $O'$ extending outwardly from the body of the valve member O intermediate the ends of the latter serves to open and close an annular inlet port $ea$ opening surrounding the upper end of the valve chamber element P. The latter has its lower end seated in the horizontal portion of a valve casing partition $A^5$ separating the inlet chamber C from the outlet chamber D and formed with a port in register with the port $fa$. The upper end of the member P is externally threaded and is screwed into and extends through a threaded opening in a horizontal portion of the valve housing partition $A^6$ which separates the inlet chamber B and outlet chamber D. The valve member O comprises an externally threaded valve spindle portion $O^2$ extending through and in threaded engagement with a valve housing bonnet member $a^5$.

The port $ea$ connects the inlet chamber B to a bonnet chamber $aa$ which is analogous to the chamber $ge$ of the valve form previously described. The port $ea$ is surrounded by an annular port $eb$ which is opened and closed by the valve port $O'$ when the latter is moved to open and close the port $ea$. The port $eb$ when opened, connects the upper portion of the chamber $P'$ in the member P to the inlet chamber B and bonnet chamber $aa$. Axially disposed in the axial chamber $O^3$ in the tubular valve member O is a pressure equalizing member HB which differs from the previously mentioned members H only in that its upper portion $H^4$ is relatively longer than is the corresponding portions of the members H previously mentioned. The relatively greater length of the part $H^4$ in Fig. 9 is due to the fact that the upper end of the part must be accessible through the upper end of the tubular valve spindle when the caps LA and $GA^2$ are removed. The caps LA and $GA^2$ correspond to the previously described cap members L and $G^2$, respectively. The cap member LA is normally in threaded engagement with the upper end of the valve spindle and closes the axial passage in the latter. The member $GA^2$ is similar in form to, and serves the general purpose of, the cap member $G^2$ previously described, but in Fig. 9 the lower end of the cap member $GA^2$ is threaded into a threaded annular seat formed in the wall of the tubular valve member O.

When the valve spindle is rotated to open the ports $ea$, $eb$ and $fa$, a fluid, which may be cold water, passes from the chamber B upward through the annular port $eb$ surrounding the previously mentioned port $ea$, into the bonnet chamber space $aa$ and into the upper end of the port $ea$. The water passing downwardly through the port $ea$ passes through the wall ports $19$ in the valve member and thence into the portion of the axial space within the valve member between the cylindrical portions $H'$ and $H^2$ of the member HB.

Cold water passes from the space between the portion H' and H² into the outlet space D through wall ports 20 in the tubular valve member O and registering ports 21 in the valve chamber P, when the axial position of the valve member O permits.

With the valve member O out of its closed position, fluid, which may be hot water, passes from the supply chamber C through the port fa into the lower portion of the valve chamber P' in the member P and passes through ports 22 in the tubular body of the valve member O into the portion of the bore O³ of the valve member O between the cylindrical portions H² and H³ of the member HB when the axial adjustment of the member HB permits. The water, entering the space between the cylindrical portions H² and H³ of the member HB, passes to the outlet chamber D through ports 23 in the wall of the valve member O and the wall ports 24 in the valve member N, when the valve member O is moved far enough away from its closed position to bring the ports 23 into register with the ports 24.

In the intended operation of the mixing valve shown in Fig. 9, the passage of cold water through the port ea from the cold water supply chamber B, and the passage of the hot water supply through the chamber C through the port fa are prevented when the valve member O is in the position in which the valve washer carried by its lower end closes the port fa and the valve washer at the underside of the annular flange O' closes the port ea. As shown, when the last mentioned washer closes the port ea, it also closes the surrounding annular port eb. As the valve member O is moved away from its closed position, cold water begins to flow from the inlet chamber B through the ports ea, eb and 19 into the space between the portions H' and H² of the member H and out of that space through the ports 20 and 21 into the outlet chamber D. After a sufficient initial opening movement of the valve member O, water begins to flow from the supply chamber C through the port ea and port 22 into the space in the lower portion of the axial chamber O³ in the valve member between the portions H² and H³ of the member HB, and when the position of the valve member O and member HB permit, water passes from the space between the portions H² and H³ into the outlet chamber D through the ports 23 in the valve member O and the ports 24 in the valve member P.

In normal operation, the member HB variably throttles the ports 19 and 22 as required to maintain equal pressures of the two liquids at opposite sides of the portion H² of the member HB. In consequence, in normal operation, the relative amounts of liquid passing to the outlet chamber D from the supply chambers B and C, will vary progressively as the valve O is adjusted from its slightly open position in which hot water begins to pass from the space between the portions H² and H³ of the member HB into the space D, into its wide open position in which the passage of cold water into the outlet space D is prevented by virtue of the fact that the port 20 is entirely out of register with the port 21. With the arrangement shown in Fig. 9, as with those shown in Figs. 1 to 4 and 7 and 8, the member HB can be removed for inspection, cleaning or replacement, or to be secured in fixed position in the pressure equalizing chamber.

For the purposes of the invention disclosed and claimed herein, the lower portion of the member O, including the ports 22 and 23, and the intermediate portion of the member, including the ports 19 and 20 constitute hot water and cold water valves, respectively, generally analogous in operation and purpose to the valves F and E of the construction shown in Figs. 1-4. The portion O² of the member O not only serves the purpose of the threaded valve spindle J of Figs. 1-4, but also serves as an adjustable portion of the valve housing shell structure through which the cap shaped closure part LA is connected to the main stationary portion of said shell structure.

In a mixing valve of the general character referred to herein, it is frequently desirable to provide a housing element such as the element Q, QA or QB shown in Figs. 1, 9 and 10, respectively, which cover more or less of the bonnet element a of the valve housing or shell. Thus in Fig. 1 the element Q covers all of the bonnet structure except the edge of the flange portion through which the screws a' extend, the hub portion a² and the removable closure element L. As shown in Fig. 1, the flat top portion of the member Q is formed with an aperture receiving the hub portion a² and a similar aperture is formed to receive the closure or cap part L. No special means are shown in Fig. 1 for securing the part Q in place. In some cases it may fit so snugly about the hub a² and part L and the heads of the screws a' that no special securing means are required. When necessary the part Q may be secured in place by screws extending through the flat top portion of the member Q into the subjacent portion of the bonnet a.

In the arrangement shown in Fig. 9, only a single opening in the top portion of the element QA is needed, and the element is secured in place by a clamping nut Q' threaded on to the hub a⁵ which is externally threaded for that purpose. The element QB, shown in Fig. 10, is also secured in place by a clamping element Q², which surrounds and is in threaded engagement with the hub a².

In the arrangement shown in Fig. 10, the relative lengths of the main cylindrical portion of the element QB and closure part L are such as to permit the flat top portion of the element QB to extend over the closure member L, so that the latter is concealed. This permits the valve shown in Fig. 10 to be more compact and simpler in appearance than the mixing valve shown in Fig. 1. The arrangement shown in Fig. 10 has the disadvantage, however, that before removing the member L, it is necessary to remove the member QA, and the removal of the latter cannot be effected without removing the valve handle secured to the upper end of the valve stem J. The members Q, QA and QB, aside from their effect in improving the appearance of the mixing valve with which they are used, are well adapted to serve as name plates carrying words or symbols indicating the mode of operation of the valve, its origin, etc.

Fig. 5A illustrates a modification in the pressure equalizing mechanism shown in Figs. 3 and 5. The pressure equalizing valve HC shown in Fig. 5A differs from the valve H shown in Figs. 3 and 5, in that its piston portions H' and H³ are supplemented by piston portions h' and h³ slightly more distant from the piston portion h². In addition, radial ports 9' are formed in the portion of the valve HC connecting the pistons H' and h'. The ports 9' open into the same upper axial passage in the member HC into which the ports 9 open. Similarly, ports 10' are formed in the portion of the member HC connecting the pistons H³ and h³. The ports 10' open into the lower axial passage in the member HC which communicates with the portion of the space in the chamber GH beneath the member HC. Ports 3" formed in the wall of the chamber GH place the ports 9' in communication with the space with which the ports 9 communicate through the ports 3. Similarly, ports 6' in the wall of the chamber GH, place the ports 10' in communication with the same hot water supply space with which the ports 10 communicate through the ports 6. The additional piston portions h' and h³ and ports 3', 9', 6' and 10', increase the range or extent to which the hot and cold water entering the chamber GH may be throttled by a given small axial movement of the chamber HC.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent is:

1. A mixing valve comprising a hollow housing shell structure with an opening at one side and closure means including a detachable part normally closing said opening, a partition structure within said shell and forming walls surrounding cold and hot water inlet chambers, an outlet chamber, cold and hot water valve chambers and a pressure equalizing chamber, movable hot and cold water valve elements in said hot and cold water valve chambers, respectively, a movable pressure equalizing valve element in said equalizing chamber, the walls of said valve chambers and pressure equalizing chamber being formed with ports variably throttled by the adjustments of the respective valve elements in said chambers and said valve and equalizing chambers having axes perpendicular to a common plane, and the axis of said equalizing chamber intersecting said opening, and said wall structure including a separable end wall part for said equalizing chamber, said end wall part and valve element being removable and replaceable through said shell opening when said detachable part is detached, and a longitudinally adjustable valve spindle extending through said side of said shell and connected to said hot and cold water valve elements.

2. A mixing valve as specified in claim 1, in which the axis of at least one of said valve chambers is laterally displaced from the axis of said equalizing chamber, and in which said shell is formed with an opening for the passage of said valve spindle alongside the said opening normally closed by said detachable closure part.

3. A mixing valve as specified in claim 1, in which said separable end wall part of the equalizing chamber extends through said shell opening and said detachable closure part is a tubular part which surrounds the portion of said wall part outside said shell and has a closed outer end.

4. A mixing valve as specified in claim 1, including means removably disposed in said equalizing chamber to prevent throttling movement in said equalizing chamber of said equalizing valve element.

5. A mixing valve as specified in claim 1, in which said hot and cold water valve elements and said valve spindle are formed by longitudinally displaced sections of a tubular element extending through the said opening in the side of said shell, and in which said detachable closure part is detachably secured to and closes the outer end of said tubular element, and in which said tubular element surrounds and forms the walls of said pressure equalizing chamber, and in which a tubular member having an open ended inner portion within and detachably connected to said tubular element intermediate the ends of the latter and having its outer end closed, may be disconnected from said tubular part to permit access to, and the removal of the valve element in said pressure chamber.

6. A mixing valve as specified in claim 1, in which the separable end wall part for the said equalizing chamber is a tubular part extending through said opening and having its outer end closed and having its open inner end in threaded engagement with the wall surrounding said equalizing chamber at the outer end of the latter, and in which the detachable closure part is in the form of a tube surrounding the outer portion of said tubular part and having its outer end closed and its inner end open and in threaded engagement with said shell at the margin of said opening.

7. A mixing valve as specified in claim 1, in which the equalizing valve is formed with an elongated tubular extension at its outer end, the outer end of which extends through said opening and in position for manual engagement when said detachable closure part and said end wall part are removed.

8. A device for insertion in and removal from the pressure equalizing chamber of a mixing valve having an elongated passage at one end of said chamber, said device including a member adapted for insertion in said chamber, and a tubular extension connected to one end of said member and adapted for insertion in said passage, said member comprising a central piston portion, two end piston portions, and two portions each smaller in cross-section than said piston portions and one of which connects one end piston to said central piston and the second of which connects the other end piston to said central piston, said member being formed with a passage through which the bore of said tubular extension is in communication with the space between the central piston and the piston to which said extension is connected, and with a second passage through which the pressures acting on the opposite sides of the other end piston are equalized.

JAMES FRASER.

REFERENCES CITED

The following references are of record in the file of this patent:

UNITED STATES PATENTS

| Number | Name | Date |
|---|---|---|
| 962,111 | Assmann | June 21, 1910 |
| 1,508,938 | Powers | Sept. 16, 1924 |
| 2,250,815 | Egg | June 29, 1941 |
| 2,277,314 | Gallagher | Mar. 24, 1942 |
| 2,308,127 | Symmons | Jan. 12, 1943 |

FOREIGN PATENTS

| Number | Country | Date |
|---|---|---|
| 395,211 | France | Dec. 21, 1908 |